United States Patent [19]

Rogols

[11] Patent Number: 5,456,938
[45] Date of Patent: * Oct. 10, 1995

[54] CRYOPROTECTED SURIMI PRODUCT

[75] Inventor: Saul Rogols, Golden, Colo.

[73] Assignee: Penwest Foods Co., Englewood, Colo.

[ * ] Notice: The portion of the term of this patent subsequent to Jul. 25, 2012, has been disclaimed.

[21] Appl. No.: 323,820

[22] Filed: Oct. 17, 1994

Related U.S. Application Data

[60] Continuation-in-part of Ser. No. 183,157, Jan. 18, 1994, which is a division of Ser. No. 9,646, Jan. 27, 1993, abandoned.

[51] Int. Cl.$^6$ .................. A23L 1/314; A23L 1/325
[52] U.S. Cl. .................. 426/643; 426/644; 426/646
[58] Field of Search .................. 426/643, 644, 426/646

[56] References Cited

U.S. PATENT DOCUMENTS

| | | | |
|---|---|---|---|
| 3,505,110 | 4/1970 | Kesler et al. | 127/29 |
| 3,582,399 | 6/1971 | Black | 127/58 |
| 4,572,838 | 2/1986 | Lanier et al. | 426/643 |
| 4,992,295 | 2/1991 | Ueno et al. | 426/643 |
| 5,028,444 | 7/1991 | Yamamoto et al. | 426/332 |
| 5,028,445 | 7/1991 | Wu et al. | 426/574 |
| 5,110,612 | 5/1992 | Quarles et al. | 426/548 |

OTHER PUBLICATIONS

G. A. MacDonald et al., "Carbohydrates as Cryoprotectants for Meats and Surimi," *Food Technology*, Mar. 1991, pp. 150, 152–154, 156, 158–159.

J. W. Park et al., "Use of Cryprotectants to Stabilize Functional Properties of Prerigor Salted Beef During Frozen Storage," *J. Food Science*, 52(3) (1987), pp. 537–542.

J. W. Park et al., "Cryoprotective Effects of Sugar, Polyols, and/or Phosphate on Alaska Pollack Surimi," *J. Food Science*, 53(1) (1988), pp. 1–3.

J. W. Park et al., "Effects of Cryoprotectants in Minimizing Physiochemical Changes in Bovine Natural Actomysin During Frozen Storage," *Journal of Food Biochemistry*, 11(1987), pp. 143–161.

T. C. Lanier, "Functional Properties of Surimi," *Food Technology*, 40(3) (1986), pp. 107–114 and 124.

J. Mans, "Kyrotaru's Bridge Across the Pacific," *Prepared Foods*, Nov., 1992, pp. 85–86 and 88.

*The Food Industry Newsletter*, vol. 21, No. 15 (Sep. 8, 1992).

*Seafood Business*, vol. 10, No. 7 (Nov./Dec., 1991), pp. 37–41.

Cryo–dex™ Product Information Bulletin (1993).

G. G. Birch et al., "Low–Calorie Products", Elsevier Applied Science, London, Eng., pp. 85–92 (1988).

J. W. Park et al., "Cryostabilization of Functional Properties of Pre-Rigor and Post–rigor Beef by Dextrose Polymer and/or Phosphates", *Journal of Food Science*, 58(3), 1993, pp. 467–472.

*Primary Examiner*—Arthur L. Corbin
*Attorney, Agent, or Firm*—Marshall, O'Toole, Gerstein, Murray & Borun

[57] ABSTRACT

A surimi product comprising a surimi, and a hydroxypropyl starch hydrolyzate product, a spherical dextrose product, or a mixture thereof as a cryoprotectant, is disclosed. The cryoprotectant is present in a sufficient amount to prevent significant freeze-induced denaturation of proteins during storage of the surimi product, and to thereby maintain protein functionality to allow use of the surimi product in the manufacture of foodstuffs. The cryoprotected surimi product also can contain a white, water-insoluble inorganic compound or an organic protein to mask Maillard browning which results from processing the cryoprotected surimi product.

26 Claims, 3 Drawing Sheets

CRYOPROTECTED SURIMI PRODUCT

CROSS-REFERENCE TO RELATED APPLICATIONS

This application is a continuation-in-part of U.S. patent application Ser. No. 08/183,157, filed Jan. 18, 1994, which is a divisional of U.S. patent application Ser. No. 08/009,646, filed Jan. 27, 1993, now abandoned.

FIELD OF THE INVENTION

The present invention relates to a method of preventing significant freeze-induced denaturation of proteins in a surimi product during storage. The present invention also relates to a method of reducing and counteracting Maillard browning of a surimi during processing of the surimi, either below, at or above ambient temperature, to a food analog or kamaboko. More particularly, the present invention relates to a surimi product comprising a surimi and a sufficient amount of a hydroxypropyl starch hydrolyzate product, a spherical dextrose product, or a mixture thereof, as a cryoprotectant to prevent significant denaturation of proteins during storage at freezing temperatures and thereby maintain protein functionality. After thawing, a cryoprotected surimi product demonstrates sufficient functionality and esthetics for use in the manufacture of foodstuffs. The surimi product also can include a water-insoluble inorganic compound or an organic protein, or a mixture thereof, to counteract Maillard browning resulting from processing the surimi.

BACKGROUND OF THE INVENTION

Surimi is a generic term for minced fish that has been processed to remove bones, fish oil and fish flavor. Typically, surimi is prepared by the fresh water leaching of mechanically deboned fish muscle. The leached muscle, after dewatering, yields a light-colored, bland proteinaceous material comprising essentially myofibrillar (contractile) protein, or surimi.

Conventionally, surimi is produced from fish, such as Alaskan pollack or Pacific whiting, however surimi derived from poultry, pork and beef also are known. With respect to fish, surimi can be prepared at sea or on shore. After production, surimi usually is frozen into blocks, typically about 20 kilograms in weight, and is stored for periods of weeks to months at freezing temperatures before use.

Frozen surimi is an intermediate protein source used to produce various foodstuffs, such as, for example, imitation crab legs, imitation scallops, kamaboko (fish jelly) and imitation lobster. The amount of surimi in such foodstuffs can range from 20% to 80% by weight of the foodstuff.

To produce a surimi-based foodstuff, the bland-tasting surimi first is thawed, then salt is added to the thawed surimi during comminution of the surimi to a paste. The salt solubilizes the myofibrillar protein. Next, starch, nonmuscle proteins (e.g., egg white, soy, whey), flavorings and colorants are added to the surimi paste. The resulting paste is formed into a desired shape (e.g., a crab leg), then heated to produce any of a range of foodstuff shapes and textures. The proteins added to the surimi help counteract Maillard browning that may occur as a result of heating the cryoprotected surimi. In addition, an inorganic compound can be added to help neutralize the Maillard browning, but amounts well in excess of 6% by weight of the surimi typically are required.

Fish species harvested to produce surimi often are available only far from shore and only during a short harvesting period. By necessity therefore, some surimi is prepared at sea, and is frozen on shipboard to preclude spoilage before use. A majority of the surimi that is processed on shore also is frozen because most fish species are harvested during a short harvesting period, but the demand for surimi is constant throughout the year. Therefore, a sufficient amount of surimi produced on shore or at sea must be frozen to accommodate this year long demand.

As previously stated, surimi comprises essentially myofibrillar proteins. Fish myofibrillar proteins are very susceptible to freeze-induced denaturation. Similar myofibrillar proteins derived from beef, pork and poultry also are subject to freeze-induced denaturation, but to a lesser extent than fish myofibrillar proteins. To overcome this susceptibility to protein denaturation, the refined myofibrillar component of fish muscle, i.e., surimi, is admixed with a cryoprotectant prior to freezing the surimi. A cryoprotectant is a chemical compound, or combination of compounds, that prevents significant protein denaturation and therefore imparts long-term storage stability to the frozen surimi. This long-term storage stability in turn ensures good protein functionality to allow use of the surimi in the manufacture of foodstuffs.

The term "functionality" refers to the specific attributes a food processor considers in adopting a protein source, like surimi, for use in a foodstuff. Functionality often is measured in terms of: (1) water binding ability to control water loss during storage, increased cook yield and increased juiciness; (2) fat binding ability to prevent fat separation during cooking; (3) texture; (4) gelation temperature and strength; (5) impact on appearance; and (6) impact on flavor and odor. As demonstrated in more detail hereafter, functionality can be expressed quantitatively as gel-forming potential, which is manifested physically as texture formation and waterbinding ability.

In the absence of a cryoprotectant, a surimi stored at freezing temperatures for extended periods has a decreased functionality. The freezing process causes ice crystal formation which results in dehydration of the myofibrillar protein, a pH decrease, and a change in salt concentration. These three effects, in addition to various hydrophobic interactions, denature and/or aggregate the frozen myofibrillar protein of surimi. In addition, the longer the surimi is frozen, the greater is the degree of protein denaturation.

Therefore, a cryoprotectant is added to the surimi to protect frozen surimi from a loss in functionality due to protein denaturing. A cryoprotectant must be intimately associated with the protein molecules to prevent denaturing. Therefore, cryoprotectants are useful in a minced product, like surimi, and are incorporated into the minced product before the product is frozen.

A cryoprotectant used to prevent significant denaturation of proteins in frozen surimi preferably meets several criteria. It is especially important for a cryoprotectant to maintain protein functionality during extended frozen storage of surimi, and thereby allow use of the surimi in the manufacture of foodstuffs. It is also desired that a cryoprotectant be relatively inexpensive, readily available, nontoxic, low in taste, water soluble, have good functional effects, and not appreciably brown the surimi during a cooking or heating process. Various proposed cryoprotectants have not met with commercial success because of their failure to meet one or more of these criteria. Such materials include: carbohydrate compounds, like mono- and di-saccharides; sugar alcohols; low molecular weight polyols; amino acids; carboxylic acids; triglycerides; hydrogenated glucose syrups; surfactants, such as polyoxyethylene sorbitan esters and sucrose esters; and quaternary amines. Other cryoprotectants and mechanisms of cryoprotection are discussed in G. A. McDonald et al., "Carbohydrates as Cryoprotectants for Meats and Surimi", *Food Technology*, March, 1991, pp. 150, 152–154, 156, and 158–159.

Presently, the standard, most widely used cryoprotectants for surimi are sucrose and sorbitol, either alone or in combination. In addition, a relatively small amount of a polyphosphate, such as sodium tripolyphosphate, conventionally is added to the surimi as a synergist to increase the cryoprotective effect of sucrose and/or sorbitol. Sucrose and sorbitol are the cryoprotectants of choice for surimi, and especially for Alaskan pollack and Pacific whiting surimi, because these cryoprotectants are readily available, relatively economical, and importantly, have a low tendency to cause Maillard browning when a surimi-based foodstuff is cooked or otherwise heated.

Maillard browning is the well-known result of a reaction between a reducing sugar and a protein to produce brown pigments. A cryoprotectant that effectively resists browning the surimi is very important with respect to the bright white kamaboko products commonly served by the Japanese, the largest consumers of surimi. The present invention particularly addresses the problem of browning a surimi during a cooking or heating process.

Sucrose and sorbitol, however, add a definite sweet taste to surimi. Sucrose alone is a useful cryoprotectant but imparts too sweet of a taste to surimi. Therefore, sucrose usually is combined with sorbitol, in about a 1:1 weight ratio, and the mixture is used as a cryoprotectant for surimi. The sucrose-sorbitol mixture still imparts a perceptible, but less sweet, taste to surimi which still is objectionable in many surimi-based foodstuffs. Therefore, it would be useful to provide a cryoprotectant: (1) that maintains the functionality of proteins in frozen surimi at least as well as sucrose and sorbitol, (2) that has a low tendency to cause Maillard browning during storage of surimi at freezing temperatures and during heating of a surimi-based foodstuff, and (3) that also possesses a low degree of sweetness. In addition to a cryoprotectant having a low tendency to cause Maillard browning, it also would be useful to incorporate a low level of a compound that counteracts, neutralizes or masks Maillard browning and that does not otherwise adversely affect the surimi or a food product prepared from the surimi.

In addition to sucrose and sorbitol, other specific cryoprotectants added to surimi include lactitol, maltose, fructose, lactose, mannitol, xylitol, lactilose, isomalt, maltitol, maltodextrin and various edible gums. These compounds have differing abilities to cryoprotect surimi. For example, maltose or fructose outperform maltodextrin as a cryoprotectant.

Another cryoprotectant for surimi is polydextrose, a polymerized glucose which is a nonsweet, low calorie hydrolyzed starch bulking agent disclosed in Lanier et al. U.S. Pat. No. 4,572,838, and usually is used in combination with sorbitol. Polydextrose is not considered a starch hydrolyzate, whereas the above-identified cryoprotectants can be considered starch hydrolyzates as set forth in "Low Calorie Products", G. Birch et al. eds., Elsevier, London (1988), pages 85–100.

Yamamoto et al. U.S. Pat. No. 5,028,444 also discloses a composition consisting essentially of sodium bicarbonate, calcium citrate and calcium lactate that can be added to surimi, prior to freezing and in addition to a cryoprotectant, to improve the functionality of the frozen surimi.

Commercially-available dextrose, in its conventional form of tetrahedral, flat platelets, has also been used as a cryoprotectant for surimi in an attempt to reduce the sweetness imparted to surimi by sucrose. Conventional dextrose, however, is a reducing sugar and contributes to Maillard browning during cooking or heating of a surimi-based foodstuff. Therefore, reducing sugars are considered unsuitable cryoprotectants for a surimi that is processed into a light or white-colored foodstuff.

Because cryoprotectants currently added to a surimi either impart an objectionable sweet taste and/or significantly contribute to Maillard browning of the surimi-based foodstuff, there exists a need for an improved cryoprotectant that maintains the functionality of proteins in a frozen surimi, is bland in taste, and does not contribute significantly to Maillard browning during storage at freezing temperatures or during processing below, at, or above ambient temperature (i.e., about 25° C.). This is especially important for a surimi produced from a red meat, which is processed into a food product at temperatures below ambient temperature. The present invention is directed both to cryoprotectants that provide a surimi having good functionality, that resist or counteract Maillard browning, that have a bland taste, and to compounds that neutralize or mask Maillard browning resulting from processing surimi, below, at or above ambient temperature.

SUMMARY OF THE INVENTION

The present invention is directed to surimi products comprising a surimi, a cryoprotectant and a compound capable of masking Maillard browning of the surimi, especially when the surimi is heated above ambient temperature. The cryoprotectant is present in an amount sufficient to prevent significant denaturation of the myofibrillar proteins in a surimi. The compound capable of counteracting Maillard browning is present, if at all, in an amount sufficient to provide a white, consumer-acceptable surimi-based foodstuff. The presence and amount of a compound to mask Maillard browning is determined by the ability of the cryoprotectant to reduce or eliminate Maillard browning. In contrast to prior cryoprotectants, the amount of suitable compound to mask Maillard browning attributed to spherical dextrose or a hydroxypropyl starch hydrolyzate is only about 6% or less, by weight of the surimi.

In accordance with an important aspect of the present invention, the cryoprotectants of the present invention do not impart an objectionable sweet taste to a surimi, and do not significantly contribute to Maillard browning of a surimi or a surimi-based foodstuff during storage at freezing temperatures. Moreover, one of the cryoprotectant materials of the invention significantly resists Maillard browning of surimi and surimi-based foodstuffs even during cooking. In addition, the Maillard browning can be counteracted or masked by the addition of a low amount of a white, water-insoluble inorganic compound or an organic protein to the surimi, either prior to freezing or after thawing the surimi to a paste-like consistency.

In particular, the surimi product comprises: (a) a surimi; (b) a sufficient amount of a hydroxypropyl starch hydrolyzate product, a spherical dextrose product, or a mixture thereof to cryoprotect the surimi, and thereby maintain the functionality of the proteins in the surimi after extended storage at freezing temperatures; and (c) optionally, a sufficient amount of a water-insoluble inorganic compound, an organic protein, or a mixture thereof, to counteract, neutralize, or mask Maillard browning resulting from processing the surimi product, especially above ambient temperature. A hydroxypropyl starch hydrolyzate product does not impart an objectionable sweet taste to the surimi and does not contribute significantly to Maillard browning of the surimi, or a surimi-based foodstuff, during a heating or cooking process above ambient temperature.

More particularly, the present invention is directed to a surimi product comprising a surimi and from about 4% to about 12%, based on the weight of the surimi, of a hydroxypropyl starch hydrolyzate product. A preferred hydroxypropyl starch hydrolyzate product has a dextrose equivalent (DE) of from about 1 to about 45, and is prepared by the controlled hydrolysis of hydroxypropylated starch. Even more preferably, the hydroxypropyl starch hydrolyzate product has a DE of from about 5 to about 35.

Another important aspect of the present invention is to provide a surimi product comprising a surimi and from about 4% to about 12%, based on the weight of the surimi, of a spherical dextrose product. Dextrose previously was incorporated into a surimi as a cryoprotectant in the form of tetrahedral-shaped, flat platelets. The three-dimensional spherical form of dextrose utilized in the present invention imparts excellent cryoprotection to surimi, and surprisingly, does not significantly contribute to Maillard browning during storage of surimi at freezing temperatures. A preferred dextrose product is a three-dimensional, spherical form of dextrose having a DE of about 90 to about 99, and having an average particle size diameter of about 100 to about 1000 microns (μm), and a range of particle size diameters of about 50 to about 3000 μm.

In accordance with another important aspect of the present invention, a hydroxypropyl starch hydrolyzate product or a spherical dextrose product can be used alone, or in combination, to cryoprotect a surimi. The hydroxypropyl starch hydrolyzate product and/or spherical dextrose product also can be incorporated into the surimi with traditional cryoprotectants, like sucrose or sorbitol, and synergists, like polyphosphates.

In accordance with another important aspect of the present invention, in a surimi product incorporating about 4% to about 12% by weight spherical dextrose, Maillard browning resulting from heating the surimi product during the manufacture of food analogs from surimi, like imitation crab, can be overcome by incorporating about 0.5% to about 6%, by weight of the surimi product, of a white, water-insoluble inorganic compound, like titanium dioxide ($TiO_2$) or calcium carbonate, or an organic protein, such as albumin or egg white, into the surimi product, either prior to freezing or after thawing the surimi.

Surimi products produced according to the invention are characterized by sufficient protein functionality such that, after extended storage at freezing temperatures, the surimi product can be used in the manufacture of foodstuffs, like fabricated seafood products. Such products demonstrate an excellent functionality, e.g., an excellent ability to form gels after extended storage at freezing temperatures and subsequent thawing and processing. Protein gelation is the primary indicator of protein muscle functionality. The denaturation and degradation of fish proteins reduces gelation ability, and thereby reduces protein functionality. Accordingly, surimi products of the present invention can effectively bind water, fat and other foodstuff ingredients, and thereby provide a foodstuff having a palatable texture. Surimi products of the present invention therefore can be processed into palatable foodstuffs.

In addition, a surimi product cryoprotected by spherical dextrose can further incorporate a suitable compound to neutralize Maillard browning that results from heating or cooking, or otherwise processing, the surimi. The resulting foodstuff therefore is esthetically, as well as functionally, acceptable to consumers. Conventional dextrose in the shape of flat platelets leads to Maillard browning that either cannot be neutralized by the presence of an inorganic compound or an organic compound, or that requires a high amount of an inorganic compound or organic protein which adversely affects the surimi, such as by making the surimi opaque. An opaque surimi is unacceptable esthetically and is not favored commercially.

BRIEF DESCRIPTION OF THE FIGURES

The above and other aspects and advantages of the present invention will become apparent from the following detailed description of the preferred embodiments of present invention taken in conjunction with the drawings, wherein.

DETAILED DESCRIPTION OF THE PREFERRED EMBODIMENTS

Figure 1:
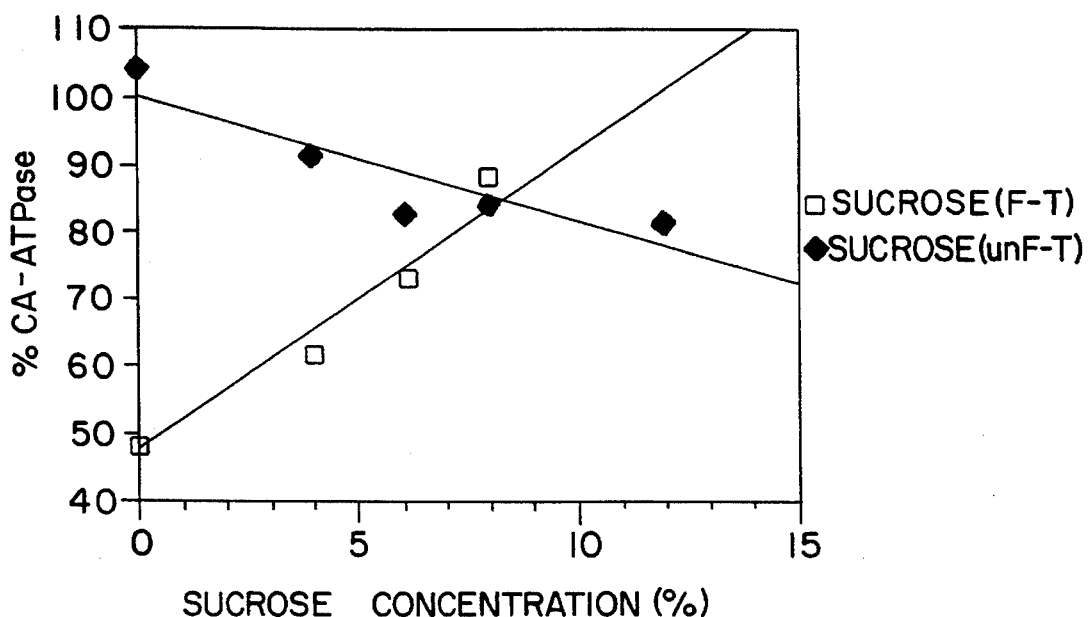
FIGS. 1–3 are plots of % $Ca^{+2}$-ATPase activity vs. weight percent of cryoprotectant, based on the weight of surimi, for unfrozen surimi and for surimi subjected to freeze-thaw (F-T) cycles.

Surimi is the frozen concentrate of animal muscle tissue. Surimi typically is prepared from fish (fish surimi), and is used in the manufacture of foodstuffs like imitation crab, imitation scallops, imitation lobster and kamaboko. Surimi is also prepared from poultry (poultry surimi), pork (pork surimi) and beef (beef surimi).

Presently, the volume of surimi prepared from poultry, beef and pork is small compared to the volume of surimi prepared from fish. Accordingly, the tests described hereinafter were performed on fish surimi, and particularly, surimi prepared from Alaskan pollack. In addition, the myofibrillar proteins comprising fish surimi are less stable than similar proteins comprising mammalian and avian surimi, and accordingly fish surimi is more susceptible to freeze-induced protein denaturation. Therefore, it is envisioned that the cryoprotectants useful in the present invention can be used in a surimi product derived from fish, as well as a surimi derived from mammalian and avian sources such as poultry, pork and beef. In particular, the cryoprotectants of the present invention can be used to prevent significant protein degradation in processed meat products. Such products include but are not limited to sausage, bologna, and hamburger wherein the processed meat is comminuted and mixed with cereals and other fillers.

In addition, although the tests described hereinafter are directed to a fish surimi derived from Alaskan pollack, a hydroxypropyl starch hydrolyzate product or a spherical dextrose product, alone or in combination with each other or another cryoprotectant, also can be used to cryoprotect a surimi derived from other fish species, like Pacific whiting. Surimi derived from Alaskan pollack presently is the largest volume fish surimi product and the economically most important. However, as supplies of Alaskan pollack become depleted and as other suitable fish species for surimi are accepted by consumers, the volume of surimi derived from fish other than Alaskan pollack is expected to increase. Nonlimiting examples of fish surimi that can be cryoprotected by a hydroxypropyl starch hydrolyzate product or a spherical dextrose product include surimi derived from Alaskan pollack, Pacific whiting, Atlantic menhaden, atka, flat fish, cod, Soviet pollack, jack mackerel, Argentine hake, arrowtooth flounder, pink salmon, and sand trout.

Therefore, in accordance with the present invention, a surimi, and especially a surimi derived from fish, is cryoprotected by incorporating a sufficient amount of (1) a hydroxypropyl starch hydrolyzate product or (2) a spherical dextrose product into the surimi, prior to freezing, to protect the surimi from freeze-induced protein denaturation. A cryoprotectant utilized in the present invention, i.e., a hydroxypropyl starch hydrolyzate product, a spherical dextrose product or a mixture thereof, is admixed with the surimi in an amount of from about 4% to about 12% by weight of the surimi. Preferably, a cryoprotectant is admixed with the surimi in an amount of from about 6% to about 10% by weight of the surimi.

In addition, prior to freezing, a white, water-insoluble inorganic compound or an organic protein can be incorporated into the surimi to neutralize Maillard browning attributed to spherical dextrose and which results from processing the surimi into a food analog, like imitation crab or kamaboko. Counteracting even slight Maillard browning of a cooked or heated surimi is important in the manufacture of kamaboko and crab analogs in order to achieve maximum consumer acceptance.

The inorganic compound or organic protein is present in an amount of 0% to about 6%, and preferably about 0.5% to about 6%, based on the weight of the cryoprotected surimi. Alternatively, the inorganic compound and/or organic protein can be admixed into the surimi after the surimi has been thawed and comminuted into a paste.

Conventionally, more than 6% by weight of an inorganic compound or an organic protein was needed to neutralize Maillard browning attributed to a dextrose cryoprotectant. Often, the Maillard browning attributed to conventional dextrose could not be masked even when high amounts, i.e., above 10% by weight, of an inorganic compound or an organic protein was added to the cryoprotected surimi.

Useful water-insoluble inorganic compounds are nontoxic, are white, and have a water solubility of less than about 5 grams per liter (g/l). The inorganic compounds are added in the form of a powder having an average particle size of about 0.5 to about 20 μm, and preferably about 1 to about 15 μm. To achieve the full advantage of the present invention, the inorganic compound has an average particle size of about 2 to about 10 μm.

Examples of specific inorganic compounds include, but are not limited to, calcium phosphate, calcium oxide, magnesium oxide, magnesium carbonate, titanium dioxide, and calcium carbonate. Examples of specific organic proteins include egg white and albumin.

A hydroxypropyl starch hydrolyzate product useful as a cryoprotectant is prepared by hydrolyzing the reaction product of propylene oxide and starch. The preparation of a hydroxypropyl starch hydrolyzate product useful as a cryoprotectant for surimi is disclosed in Kesler et al. U.S. Pat. No. 3,505,110, Quarles et al. U.S. Pat. No. 5,110,612, and Quarles et al. U.S. Pat. No. 5,294,453, each incorporated herein by reference.

Kesler et al. U.S. Pat. No. 3,505,110 discloses low calorie sugar products prepared by hydrolyzing hydroxypropylated starch. The hydrolysis products principally comprise glucose and hydroxypropylated polysaccharides and include little or no (preferably less than 0.5%) maltose.

Quarles et al. U.S. Pat. No. 5,110,612 discloses preferred hydrolyzate products of hydroxypropylated starch that comprise greater than about 15% by weight DP 2-6 hydrolyzate polymers and have a DE value of about 20 to about 45. These hydrolyzate products have bulking agent properties similar to those of sucrose in baked goods and other types of food products.

The hydroxypropyl starch hydrolyzate products disclosed by Quarles et al. have a bitter off-flavor which can render these hydrolysis products undesirable for particular food applications. The bitter off-flavor is attributed to hydrolysis products of hydroxypropyl starch hydrolysis products having molecular weights of about 200 to about 350 daltons (i.e., roughly between the molecular weights of glucose (180) and maltose (342)) and are theorized to be one or more isomers of mono-, di- or tri-hydroxypropyl glucose. However, as will be demonstrated hereinafter, the bitter off-flavor of these hydrolysis products does not adversely affect a fish surimi because the bland, slightly fishy taste of the surimi masks the bitter flavor of the hydroxypropyl starch hydrolyzate product. Quarles et al. U.S. Pat. No. 5,294,453 discloses hydroxypropyl starch hydrolyzate product having a reduced bitter off-flavor.

Preferred hydroxypropyl starch hydrolyzate products for use in the invention include those disclosed by Kesler et al., which have a DE of about 1 or greater, and are not too sweet tasting. Such products do not impart an objectionable sweet taste to a surimi product, and therefore overcome a disadvantage associated with traditional cryoprotectants, like sucrose.

Most preferred are hydroxypropyl starch hydrolyzate products prepared according to the method disclosed in Quarles et al. U.S. Pat. No. 5,110,162. Such hydroxypropyl starch hydrolyzate products are characterized by DE values of from about 10 to about 45, and a sufficient amount of DP 1 monomers and DP 2-6 hydroxypropyl starch hydrolyzate products to provide a hydroxypropyl starch hydrolyzate product that sufficiently cryoprotects frozen myofibrillar protein and does not impart an objectionable taste to the surimi, either too sweet or too bitter. Most preferred is a hydroxypropyl starch hydrolyzate product characterized by a DE of about 15 to about 30 and which also has a DP 2-6 of about 15% to about 25% by weight, and a DP 1 of up to about 10% by weight.

In accordance with another embodiment of the present invention, a spherical dextrose product also can be used to effectively cryoprotect a surimi. Dextrose, in its conventional form as tetrahedral, flat platelets, has been used previously to cryoprotect surimi, but contributes significantly to Maillard browning during storage of a surimi at freezing temperatures, and during processing of a surimi below, at, or above ambient temperature. For many foodstuffs, Maillard browning is undesirable, or unacceptable, because the consumer prefers, or demands, a white food product.

A spherical dextrose product not only cryoprotects a surimi, but in contrast to conventional dextrose products, the surimi product also resists Maillard browning during storage at freezing temperatures. It is theorized, but not relied upon herein, that a spherical form of dextrose has a better solubility and a greater ability to penetrate the surimi, and provides a greater surface area to more intimately contact the myofibrillar proteins than does dextrose in its conventional form. In contrast, conventional dextrose products previously used as surimi cryoprotectants are flat, or planar, forms of dextrose that had a tendency to remain on the surface of the surimi. The conventional planar forms of dextrose impart an unacceptable brown color to a surimi during storage at freezing temperatures. Unexpectedly, a spherical dextrose product does not significantly contribute to the Maillard browning of a surimi during storage at freezing temperatures.

In addition, Maillard browning attributed to the conventional flat form of dextrose when the surimi is processed into food analog by conventional cooking procedures could not be counteracted or required a large amount of a suitable compound to counteract the Maillard browning. Often, the surimi was adversely affected, either functionally or esthetically, by the presence of a large amount of a compound to counteract Maillard browning.

Surprisingly, and in accordance with an important feature of the present invention, a compound to counteract Maillard browning either is not needed, or the Maillard browning can be counteracted or neutralized by the addition of about 0.5% to about 6% by weight of the cryoprotected surimi, of a suitable water-insoluble inorganic compound or a suitable organic protein. This amount of an inorganic compound or an organic protein is substantially less than the amount needed when a conventional dextrose is used as a cryoprotectant, and does not adversely affect the surimi product.

A spherical dextrose product useful as a cryoprotectant has a DE of about 90 to about 99. A preferred spherical dextrose product has a DE of about 95 to about 99. In particular, a spherical dextrose product useful as a cryoprotectant for surimi has a DE of about 90 to about 99 and an average particle size diameter of about 100 to about 1000 µm, and preferably about 150 to about 750 µm; and a range of particle size diameters of about 50 to about 3000 µm, and preferably about 100 to about 1000 µm. Spherical dextrose products having an average particle size diameter of about 200 to about 400 µm, and a range of particle size diameters of about 150 to about 500 µm are sold under the tradenames CRYO-DEX™ and CANTAB®, available from Penwest Foods, Englewood, CO. CRYO-DEX™ is a spray dried spherical dextrose product having a DE of about 99 and including at least 99.5% by weight dextrose. CANTAB® is a spherical dextrose product having a DE of about 95 to about 97.

Conventional forms of dextrose comprise granules of which at least 80% by weight pass through a 60 mesh sieve. In contrast, CRYO-DEX™ spherical dextrose comprises cocrystallized spherical dextrose granules wherein essentially no granules are retained on a 12 mesh sieve, and greater than 50% by weight of the granules are retained on a 60 mesh sieve, or alternatively stated, are greater than 250 microns (µm) in diameter. TABLE I compares the sieve analysis for CRYO-DEX™ spherical dextrose to a conventional dextrose product. In addition, a 20% by weight aqueous solution of CRYO-DEX™ has a transmittance at 350 µm wavelength of at least 80%, and has a pH of about 3.5 to about 5.5.

TABLE I

| Product | Sieve Analysis | | | | |
|---|---|---|---|---|---|
| | on 20 | on 40 | on 60 | on 100 | through 100 |
| CRYO-DEX ™ | 0.2 | 12.0 | 47.6 | 31.2 | 9.0 |
| Commercial Dextrose | 0.5 | 2.6 | 11.7 | 46.5 | 38.7 |

A hydroxypropyl starch hydrolyzate product, a spherical dextrose product, or a mixture thereof, can be admixed with a surimi, prior to freezing, to protect the surimi from freeze-induced protein degradation. A hydroxypropyl starch hydrolyzate product or a spherical dextrose product also can be used in conjunction with conventional cryoprotectants, such as sucrose or sorbitol, to cryoprotect a surimi. The inclusion of a polyphosphate, like sodium tripolyphosphate, tetrasodium pyrophosphate or tetrapotassium pyrophosphate, as a synergist for the cryoprotectants, does not adversely affect the hydroxypropyl starch hydrolyzate product or the spherical dextrose product. In addition, the addition of a monobasic or dibasic phosphate salt, like sodium dihydrogen phosphate, disodium hydrogen phosphate, potassium dihydrogen phosphate and dipotassium hydrogen phosphate, to provide a pH of about 6 to about 7 does not adversely affect the cryoprotected surimi product.

The total amount of cryoprotectant added to a surimi is generally from about 4% to about 12% by weight of the surimi. Preferably, the total amount of cryoprotectant added to the surimi is from about 6% to about 10% by weight of the surimi. A polyphosphate synergist is included in an amount of up to about 1% by weight of the surimi. A white, water-insoluble inorganic compound or an organic protein also can be added to the surimi product in an amount of about 0.5% to about 6%, by weight of the surimi product, prior to freezing the surimi. The water-insoluble inorganic compound has an average particle size of about 0.5 to about 20 µm. Alternatively, the inorganic compound or organic protein is added to the surimi after the cryoprotected surimi is thawed and comminuted to a paste-like consistency. The monobasic or dibasic phosphate salt can also be added after the cryoprotected surimi is thawed.

To demonstrate the usefulness of the present invention, a hydroxypropyl starch hydrolyzate product or a spherical dextrose product was incorporated into a fish surimi and tested for: (1) an ability to cryoprotect frozen surimi, (2) an ability to maintain the functionality of proteins in surimi that has been stored below freezing temperatures, (3) an ability to resist Maillard browning during storage at freezing temperatures, and (4) an ability to avoid imparting a sweet or an off-taste to the surimi or a surimi-based foodstuff. A suitable inorganic compound or organic protein is incorporated into the cryoprotected surimi to test for an ability to mask Maillard browning resulting from heating the cryoprotected surimi.

In the tests described hereinafter the hydrolyzed hydroxypropyl starch hydrolyzate product utilized as a cryoprotectant was prepared in accordance with the methods disclosed in Quarles et al. U.S. Pat. No. 5,110,612 and had a DE of about 24.4, a DP 2-6 of about 17.8% by weight and a DP 1 of about 9.6% by weight. The spherical dextrose product utilized as a cryoprotectant was CRYO-DEX™ or CANTAB®, spherical dextrose products having an average particle size diameter of about 200 to about 400 μm, and available from Penwest Foods Co., Englewood, Colo.

EXAMPLE 1

In this example, the ability of a hydroxypropyl starch hydrolyzate product or a spherical dextrose product to cryoprotect a surimi was compared to the ability of sucrose, an industry standard, to cryoprotect a surimi. In the first of these comparative tests, a model fish protein (actomyosin) was frozen and thawed under controlled conditions to determine the effectiveness of a hydroxypropyl starch hydrolyzate product or a spherical dextrose product as a cryoprotectant. In this comparative test, $Ca^{+2}$-ATPase activity was determined after freezing and thawing a test sample. It is known to those skilled in the art that $Ca^{+2}$-ATPase activity correlates well with protein functionality in a surimi, i.e., that a high $Ca^{+2}$-ATPase activity indicates good protein functionality.

Figure 2:
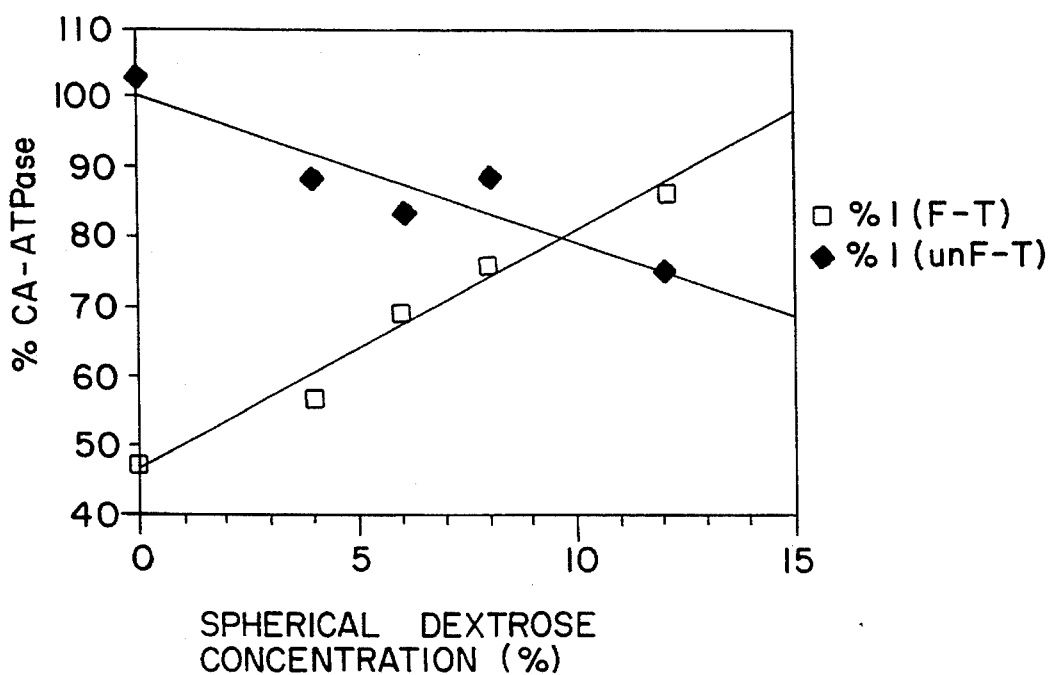
Figure 3:
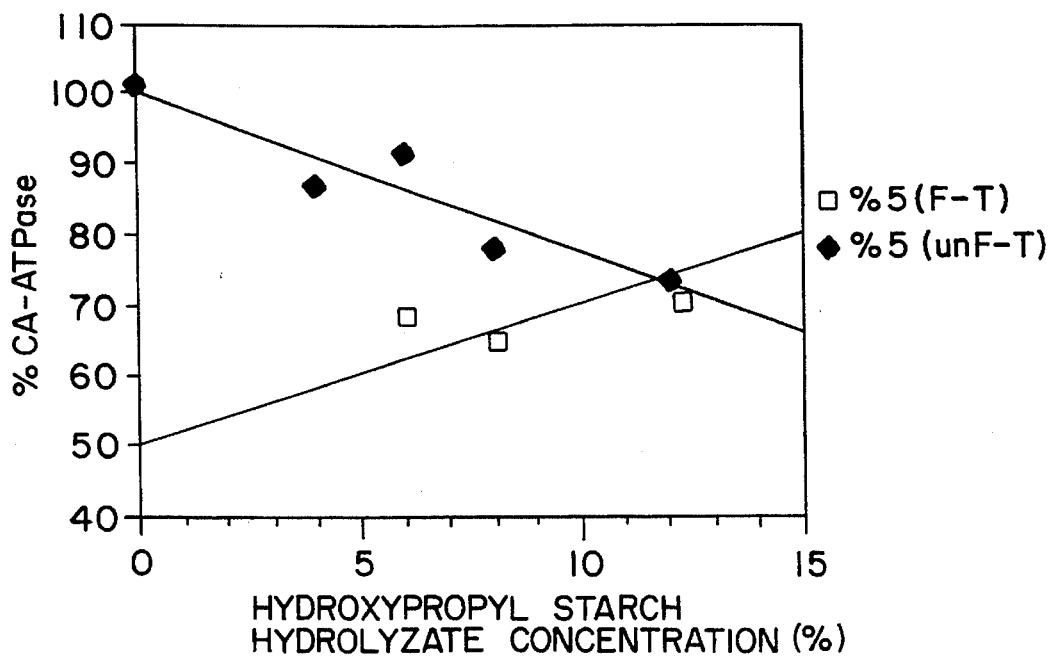

The results of these comparative tests are illustrated in the plots of FIGS. 1 through 3. In each of FIGS. 1 through 3, the ordinate (Y-axis) plots the % $Ca^{+2}$-ATPase activity of the fish protein and the abscissa (x-axis) plots the percentage by weight of cryoprotectant incorporated into the surimi. In each of FIGS. 1 through 3, the % $Ca^{+2}$-ATPase decreases with an increasing concentration of cryoprotectant for unfrozen (unF-T) surimi samples. This decrease is an artifact that indicates a decreased $Ca^{+2}$-ATPase activity, but is not related to actual protein denaturation.

With respect to FIG. 1, sucrose, the industry standard, exhibits good cryoprotectancy as demonstrated by the increasing % $Ca^{+2}$-ATpase activity for surimi samples that include an increasing amount of sucrose and that have been subjected to a freeze-thaw cycle (F-T). FIGS. 2 and 3 similarly demonstrate an increase in % $Ca^{+}$-ATPase activity for a surimi sample cryoprotected with either a spherical dextrose product or a hydroxypropyl starch hydrolyzate product, respectively. Both FIGS. 2 and 3 illustrate a direct relationship between % $Ca^{+2}$-ATPase and weight percent of cryoprotectant, thereby showing that, like sucrose, a spherical dextrose product or a hydroxypropyl starch hydrolyzate product effectively cryoprotect fish protein against freeze-induced denaturation.

The slope of the F-T (freeze-thaw) plot of FIG. 1 (sucrose), a well known cryoprotectant, approximates the slope of the F-T plot in FIGS. 2 and 3, thereby indicating to a person skilled in the art that sucrose, a hydroxypropyl starch hydrolyzate product, and a spherical dextrose product are effective cryoprotectants. However, it also is known to those skilled in the art that sucrose imparts too sweet of a taste to a surimi and to foodstuffs derived therefrom, and therefore cannot be used at high levels. Conventionally, sucrose is used at a level of about 4% by weight of the surimi, in conjunction with sorbitol, as a cryoprotectant. The cryoprotectants utilized in the present invention do not possess the disadvantage of relatively unacceptable sweetness and therefore can be used at high levels without the need to incorporate sorbitol to reduce sweetness. A spherical dextrose product is lower in sweetness compared to sucrose and therefore helps overcome the sweetness problem associated with sucrose. A hydroxypropyl starch hydrolyzate product has essentially no sweetness, and its slight bitter off-taste is masked by the bland taste of surimi.

EXAMPLE 2

In this example, a set of tests compared the gelling properties of a hydroxypropyl starch hydrolyzate product to sucrose. Protein gelation, as measured by gel-forming ability, is a primary indicator of muscle protein functionality. The most informative method for both measuring and specifying the gel-forming properties of fish protein, and other proteins as well, is through a torsional measurement of both: (1) the strain to gel failure and (2) the rigidity (calculated from stress and strain to failure measurements) of heat-induced gels prepared by standardized procedures. The plotting of these torsional measurements (shear stress v. shear strain) reveals the general sensory properties of the gel. The stress and strain tests are fully explained in J. W. Park et al., *J. Food Sci.*, 52(3), (1987), pp. 537–542.

Figure 4:
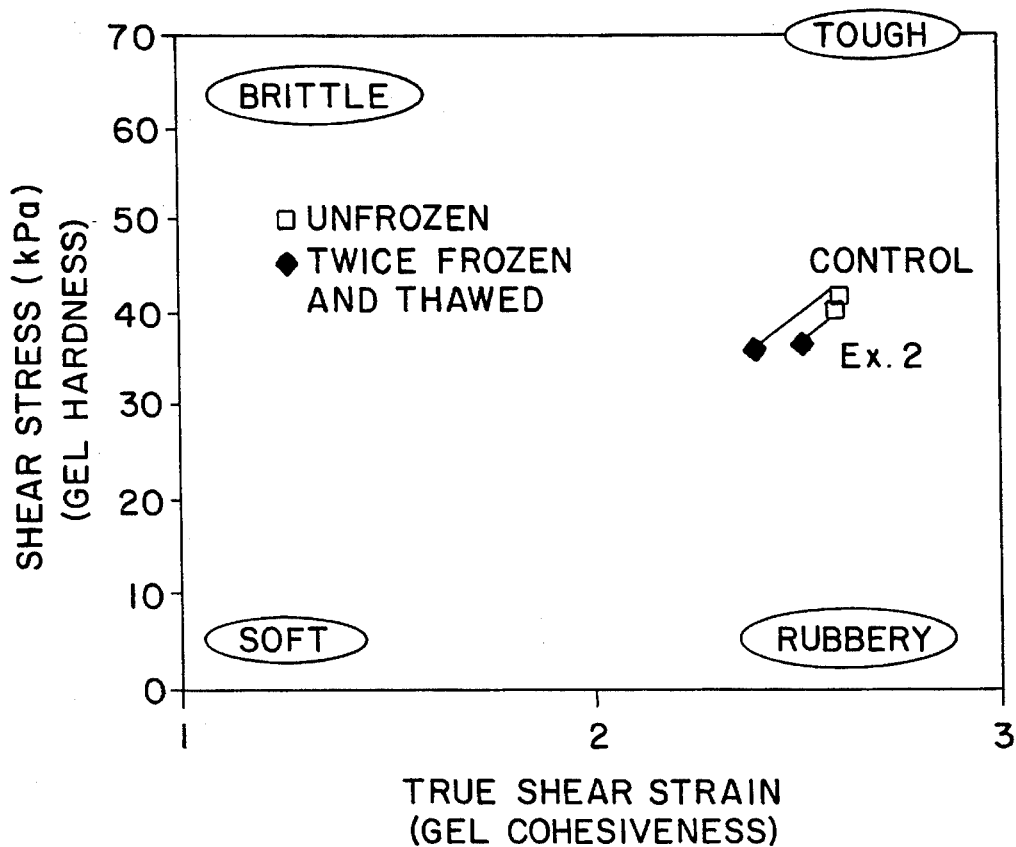
FIG. 4 is a plot of shear stress v. shear strain for unfrozen and for twice frozen and thawed surimi samples either absent a cryoprotectant or incorporating a hydroxypropyl starch hydrolyzate product.

FIG. 4 illustrates common sensory terms used to describe the texture of gels falling in the regions of the four "corners" of a shear stress v. shear strain plot. The human mouth is able to perceive, in general, the relative ratio of rigidity, or stiffness, (i.e., shear stress) to cohesiveness of a product (i.e., shear strain). A higher value for this stress to strain ratio translates into a "brittle" or friable, sensation, while a low value for the stress to strain ratio translates to a "rubbery" texture. In gels wherein a relative balance exists between the gel stress and gel strain, the overall magnitude of the two textural parameters (rigidity and cohesion) place the textural sensation on a continuum moving from a perception of "soft", or "mushy", upwards to a perception of "toughness".

FIG. 4 also illustrates the results of incorporating a hydroxypropyl starch hydrolyzate product produced according to the methods of Quarles et al. U.S. Pat. No. 5,110,612 and having a DE of about 24.4 and a DP 2-6 of about 17.8% by weight into a surimi that is used in the preparation of an imitation crabstick.

| Cryoprotected Surimi | |
|---|---|
| Surimi derived from Alaskan Pollack | 96% (by weight) |
| Hydroxypropyl Starch Hydrolyzate Product (D.E. about 24.4, D.P. 2–6 about 17.8%) | 4% (by weight) |

The results of shear stress and shear strain tests on the surimi cryoprotected with a hydroxypropyl starch hydrolyzate product were compared to stress and strain tests on a surimi that did not include a cryoprotectant (control sample). An unfrozen portion of the control surimi and of the cryoprotected surimi were each formed into an imitation crabstick by admixing the surimi with standard foodstuff ingredients. A second portion of the control surimi and the cryoprotected surimi were each twice frozen and thawed prior to admixing with standard foodstuff ingredients and shaping into an imitation crabstick. The ability of the various surimi samples to form gels was determined by measuring shear stress (gel hardness) and shear strain (gel cohesiveness) by standard procedures known to those skilled in the art.

The results of the shear stress and shear strain tests for the unfrozen and freeze-thawed surimi samples are plotted in FIG. 4. From FIG. 4, the control surimi sample (i.e., including no cryoprotectant) showed a significant decrease in gelling properties (i.e., a softer product) after the control surimi sample was twice frozen and thawed. In contrast, by adding 4% by weight of a hydroxypropyl starch hydrolyzate product to the surimi, the unfrozen cryoprotected surimi of was not adversely affected compared to the control sample (both are at the essentially identical position of the plot). In addition, the cryoprotectant utilized in the present invention prevented significant protein degradation and therefore maintained the functional properties of the surimi. The twice frozen and thawed cryoprotected surimi, which included a hydroxypropyl starch hydrolyzate product, provided a gel having significantly improved properties compared to the twice frozen and thawed control sample.

EXAMPLE 3

Figure 5:
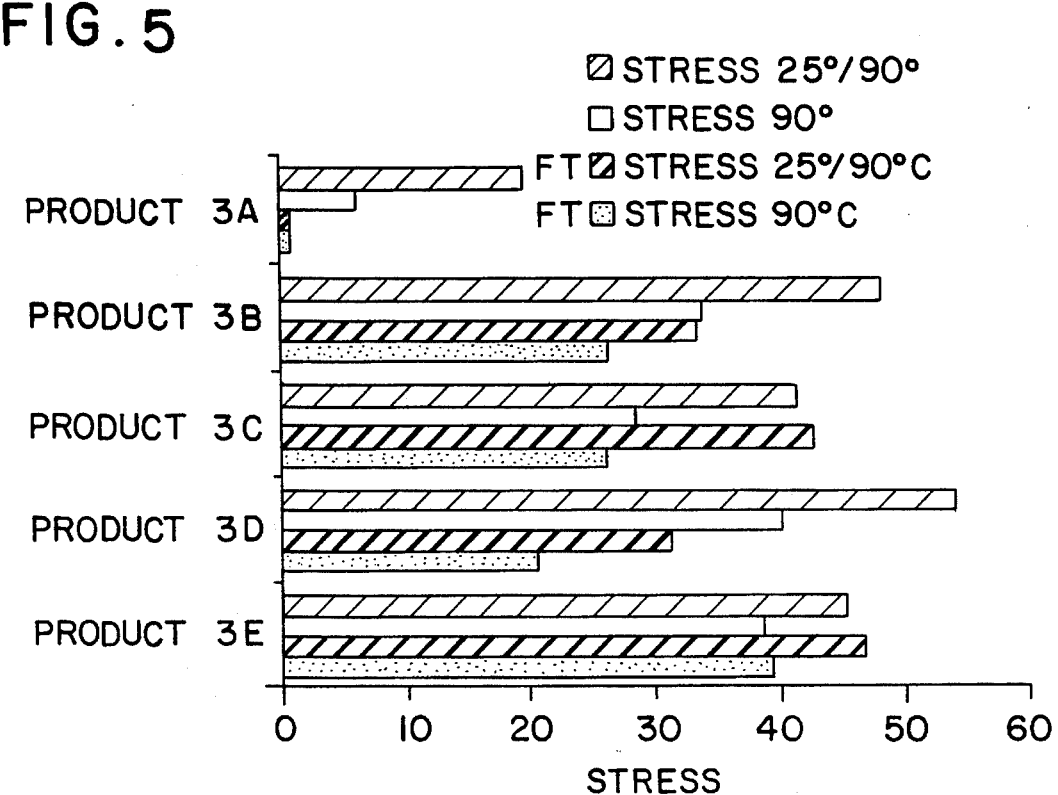
FIGS. 5 and 6 are bar graphs illustrating the gel stress and gel strain, respectively, of surimi samples either including or absent a cryoprotectant, and processed either at 25° C. and at 90° C. or only at 90° C.
Figure 6:
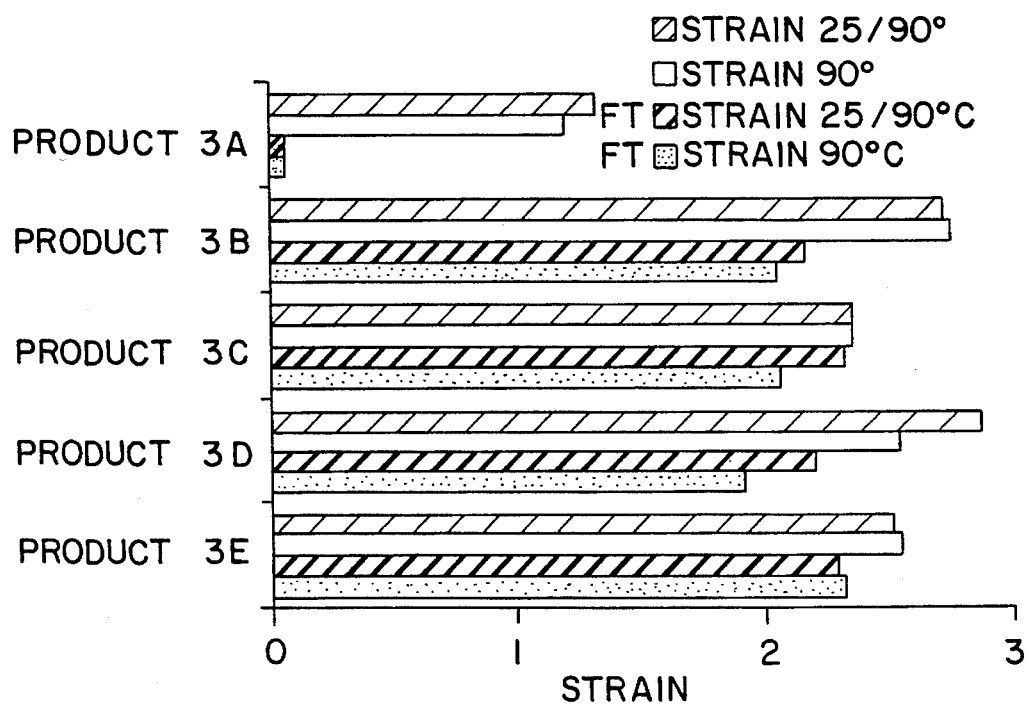

In this example, further tests were performed on surimi prepared from Alaskan pollack. FIGS. 5 and 6 illustrate the stress (gel strength) and strain (gel cohesiveness), respectively, of various surimi gels, which either include or are lacking a cryoprotectant. The strength and cohesiveness of the gels were measured by standard techniques on a Torsion Gelometer for torsional failure (twisting until breakage). The gel stress and gel strain illustrated by the bar graphs in FIGS. 5 and 6, respectively, were measured for each surimi sample after portions of the surimi sample were subjected to one of a different set of conditions. For example, a portion of each surimi sample was tested prior to freezing and a second portion of each surimi sample was tested after undergoing a freeze-thaw (FT) cycle. In this test, the frozen surimi samples were stored at −20° C. for two weeks. The gelling properties for each surimi sample also were tested after processing a portion of a surimi sample at 90° C. (a pasteurization cook) for one hour, or after preprocessing a portion of a surimi sample at 25° C. for 15 minutes followed by processing at 90° C. for one hour.

The bar graphs in FIGS. 5 and 6 therefore are derived from five different surimi samples:

Product 3A

The control sample did not include a cryoprotectant, but 4% sucrose (by weight), 4% sorbitol and 0.3% sodium triopolyphosphate was added to the control sample prior to testing and after thawing (for freeze-thawed samples) in order to use gel measurements as a measure of protein denaturation during frozen storage.

Product 3B

An Alaskan pollack surimi including 8% sorbitol, by weight, as a cryoprotectant and 0.3% sodium tripolyphosphate as a cryoprotectant synergist.

Product 3C

An Alaskan pollack surimi including 8% hydroxypropyl starch hydrolyzate product (DE about 24.4, DP 2-6 about 17.8%), by weight, as a cryoprotectant and 0.3% sodium tripolyphosphate as a cryoprotectant synergist.

Product 3D

An Alaskan pollack surimi including 4% sorbitol and 4% sucrose, by weight, as a cryoprotectant and 0.3% sodium tripolyphosphate as a cryoprotectant synergist.

Product 3E

An Alaskan pollack surimi including 8% spherical dextrose product (CRYO-DEX™, DE about 99), by weight, as a cryoprotectant and 0.3% sodium tripolyphosphate as a cryoprotectant synergist.

The bar graphs of FIGS. 5 and 6 illustrate that the Product 3A control exhibited significantly poorer gel performance than any of the cryoprotected samples even after a relatively short two week storage period at freezing temperatures. This result illustrates the overall need to cryoprotect frozen surimi. For portions of the surimi samples that were not frozen, the gelling ability for the four cryoprotected samples was approximately the same. For pollack surimi, gels preset at 25° C. typically exhibit higher stress values that gels than are not preset, and exhibit strains that are very similar. These results are illustrated in FIGS. 5 and 6 as the unshaded or lightly-shaded bars.

Other portions of the surimi samples were subjected to a six cycle freeze-thaw process of 24 hours storage in a 4° C. cooler followed by 24 hours storage in a −20° C. freezer, repeated six times. This cyclical freeze-thaw process accelerates the protein denaturation process that occurs over long-term storage at freezing temperatures. FIGS. 5 and 6 illustrate that the gel strain and gel stress became unmeasurable for a surimi (Product 3A) that does not include a cryoprotectant and that is subjected to a cyclical freeze-thaw cycle. In terms of texture, the processed surimi lacking a cryoprotectant (Product 3A) was too soft and mushy to grind and test on the torsion equipment. In general, this soft, mushy surimi has a strain of less than 0.5. A high quality surimi typically exhibits a strain of about 1.7 to about 2.6 after frozen storage.

The four surimi samples including a cryoprotectant (Products 35B–3E) each provided gels having excellent gel stress and gel strain measurements. Both the hydroxypropyl starch hydrolyzate product (Product 3C) and the spherical dextrose product (Product 3E) demonstrated an ability to cryoprotect surimi at least as well as the standard cryoprotectants (e.g., sorbitol or sucrose/sorbitol, as in Products 3B and 3D, respectively, used in the industry. Both the hydroxypropyl starch hydrolyzate product and the spherical dextrose product provided cryoprotected surimi products (Products 3C and 3E, respectively) that showed essentially no change in gel stress or gel strain due to freeze-thaw cycling. The bar graphs clearly show that the stress and strain for cryoprotected surimi samples of Products 3C and 3E are essentially identical for unfrozen portions of the samples and for portions of the samples subjected to freeze-thaw cycles. In comparison, surimi samples cryoprotected with sorbitol (Product 3B), or a combination of sucrose and sorbitol (Product 3D), demonstrated a decrease in gel stress and gel strain after freeze-thaw cycling. A decrease in gel strain is indicative of a decrease in the functional qualities of the protein. Accordingly, a hydroxypropyl starch hydrolyzate product or a spherical dextrose product effectively cryoprotects fish surimi and prevents significant protein denaturation during long storage periods at freezing temperatures.

Visual and taste tests performed in conjunction with the above-described tests also demonstrated that a surimi cryoprotected with a spherical dextrose product has more clarity and sheen, and less sweetness, than a surimi cryoprotected with sucrose. A hydroxypropyl starch hydrolyzate product has essentially no sweet taste, and can have a slightly bitter off-taste. A surimi cryoprotected with a hydroxypropyl starch hydrolyzate product, however, does not have a sweet taste or a slightly bitter off-taste. The taste of the hydroxypropyl starch hydrolyzate product is masked by the natural taste of the surimi. The lack of sweetness and lack of a bitter off-taste is an advantage because no artificial taste is imparted to the surimi, and the natural flavor of surimi is preferred by a majority of consumers.

In addition, Products 3F and 3G are prepared. Products 3F and 3G are identical to Product 3E except for including 1% by weight calcium carbonate (Product 3F) or 1% by weight egg white (Product 3G). The calcium carbonate or egg white is added prior to freezing the surimi. After heating, the color of the product is measured by a reflectance colorimeter. Products 3F and 3G are whiter than Product 3E, thereby neutralizing the low amount of Maillard browning that is observed when Product 3E is heated. In another test, 1% by weight calcium carbonate is added to Product 3E after Product 3E is thawed and comminuted to a paste. After heating, the resulting product compares in whiteness to Product 3F and is whiter than Product 3E.

EXAMPLE 4

An Alaskan pollack surimi including 8% spherical dextrose product (CANTAB® DE about 95 to about 97), by weight, as a cryoprotectant and 0.3% sodium tripolyphosphate as a cryoprotectant synergist is prepared. The cryoprotected surimi product of Example 4 exhibits esthetic and functional properties essentially identical to the cryoprotected surimi Product 3E.

In another test, two surimi samples are prepared. The two surimi samples include an identical amount of titanium dioxide and an identical amount (8% by weight) of a cryoprotectant. Conventional dextrose is the cryoprotectant in one sample. A spherical dextrose product (CANTAB®) is the cryoprotectant in the second sample. After processing the two surimi products at a temperature greater than ambient temperature, the sample cryoprotected with conventional dextrose is perceptively darker than the surimi sample cryoprotected with a spherical dextrose product. Accordingly, the amount of Maillard browning attributed to the spherical dextrose product is low compared to the Maillard browning attributed to conventional dextrose. In addition, the Maillard browning attributed to spherical dextrose can be masked by titanium dioxide. Maillard browning attributed to conventional dextrose is not masked by 0.5% to 6% by weight of a white, water-insoluble organic compound (TiO$_2$). Masking of Maillard browning attributed to conventional dextrose requires an amount of titanium dioxide that adversely affects the surimi product.

Therefore, Maillard browning resulting from heating a surimi product cryoprotected with spherical dextrose can be masked by about 0.5% to about 6% by weight of the surimi of a white, water-insoluble inorganic compound or an organic protein. This amount of inorganic compound or organic protein is substantially less than the amount needed when a conventional dextrose is used as a cryoprotectant. The ability to prepare, store and process a surimi product without perceivable Maillard browning, especially at temperatures above ambient temperature, is important and necessary in the manufacture of food analogs, like crab analogs, and especially in the manufacture of kamaboko, a Japanese food staple.

In addition to use as a cryoprotectant, a hydroxypropyl starch hydrolyzate product or a spherical dextrose product also can be used in shipboard mincing processes to preventing significant protein decomposition of unfrozen minced fish, and thereby allow further processing of the unfrozen mince on shore. The cryoprotectants utilized in the present invention also can be used to protect beef, pork or poultry surimi, or processed meats, from significant protein denaturation during long storage periods at freezing temperatures.

Obviously, many modifications and variations of the invention as hereinbefore set forth can be made without departing from the spirit and scope thereof, and therefore only such limitations should be imposed as are indicated by the appended claims.

What is claimed is:

1. A surimi product comprising a surimi; a sufficient amount of a spherical dextrose product to cryoprotect the surimi and to maintain functionality of proteins in the surimi; and about 0.5% to about 6% by weight of the surimi product of a white, water-insoluble inorganic compound.

2. The surimi product of claim 1 wherein the surimi is beef surimi, pork surimi, poultry surimi, fish surimi, or a mixture thereof.

3. The surimi product of claim 1 wherein the surimi is fish surimi.

4. The surimi product of claim 1 wherein the spherical dextrose product is present in an amount of from about 4% to about 12% by weight of the surimi.

5. The surimi product of claim 1 wherein the spherical dextrose product has a DE of about 90 to about 99.

6. The surimi product of claim 1 wherein the spherical dextrose product has a DE of about 95 to about 99.

7. The surimi product of claim 1 wherein the spherical dextrose product has an average particle size of from about 100 to about 1000 μm.

8. The surimi product of claim 1 wherein the spherical dextrose product has a range of particle size diameters of from about 50 to about 3000 μm.

9. The surimi product of claim 1 wherein the spherical dextrose product comprises greater than 50% by weight spherical granules having a diameter greater than 250 microns.

10. The surimi product of claim 1 further comprising a polyphosphate as a synergist for the spherical dextrose product.

11. The surimi product of claim 1 further comprising a sufficient amount of a dibasic phosphate salt, a monobasic phosphate salt or a mixture thereof to provide a pH of about 6 to about 7.

12. The surimi product of claim 1 wherein the inorganic compound has a water solubility of less than about 0.5 grams per liter.

13. The surimi product of claim 1 wherein the inorganic compound has an average particle size of about 0.5 to about 20 μm.

14. The surimi product of claim 1 wherein the inorganic compound is selected from the group consisting of titanium dioxide, calcium carbonate, calcium phosphate, calcium oxide, magnesium oxide, magnesium carbonate, and mixtures thereof.

15. A surimi product comprising a surimi; a sufficient amount of a spherical dextrose product to cryoprotect the surimi and to maintain functionality of proteins in the surimi; and about 0.5% to about 6% by weight of the surimi product of an organic protein.

16. The surimi product of claim 15 wherein the surimi is beef surimi, pork surimi, poultry surimi, fish surimi, or a mixture thereof.

17. The surimi product of claim 15 wherein the surimi is fish surimi.

18. The surimi product of claim 15 wherein the spherical dextrose product is present in an amount of from about 4% to about 12% by weight of the surimi.

19. The surimi product of claim 15 wherein the spherical dextrose product has a DE of about 90 to about 99.

20. The surimi product of claim 15 wherein the spherical dextrose product has a DE of about 95 to about 99.

21. The surimi product of claim 15 wherein the spherical dextrose product has an average particle size of from about 100 to about 1000 μm.

22. The surimi product of claim 15 wherein the spherical dextrose product has a range of particle size diameters of from about 50 to about 3000 μm.

23. The surimi product of claim 15 wherein the spherical dextrose product comprises greater than 50% by weight spherical granules having a diameter greater than 250 microns.

24. The surimi product of claim 15 further comprising a polyphosphate as a synergist for the spherical dextrose product.

25. The surimi product of claim 15 further comprising a sufficient amount of a dibasic phosphate salt, a monobasic phosphate salt or a mixture thereof to provide a pH of about 6 to about 7.

26. The surimi product of claim 15 wherein the organic protein is selected from the group consisting of albumin, egg white or a mixture thereof.

* * * * *

UNITED STATES PATENT AND TRADEMARK OFFICE
CERTIFICATE OF CORRECTION

PATENT NO. : 5,456,938
DATED : October 10, 1995
INVENTOR(S) : SAUL ROGOLS

It is certified that error appears in the above-identified patent and that said Letters Patent is hereby corrected as shown below:

Column 11, line 32, "ATpase" should be --ATPase--

Column 12, lines 66-67, "surimi of was not" should be --surimi was not--

Column 14, line 2, "that gels than" should be --than gels that--

Column 14, line 21, "35B" should be --3B--

Signed and Sealed this

Twentieth Day of February, 1996

BRUCE LEHMAN
Commissioner of Patents and Trademarks

Attest:

Attesting Officer